(12) United States Patent
Bruce et al.

(10) Patent No.: US 8,848,201 B1
(45) Date of Patent: Sep. 30, 2014

(54) MULTI-MODAL THREE-DIMENSIONAL SCANNING OF OBJECTS

(71) Applicant: Google Inc., Mountain View, CA (US)

(72) Inventors: James R. Bruce, Sunnyvale, CA (US); Ryan Hickman, Mountain View, CA (US); Arshan Poursohi, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/793,071

(22) Filed: Mar. 11, 2013

Related U.S. Application Data

(60) Provisional application No. 61/716,509, filed on Oct. 20, 2012.

(51) Int. Cl.
*G01B 11/24* (2006.01)

(52) U.S. Cl.
CPC .................................. *G01B 11/24* (2013.01)
USPC .......................................... 356/601; 356/607

(58) Field of Classification Search
CPC ...... A61C 9/006; A61C 7/002; A61C 9/0053; G01B 11/24; G01B 11/25; G01B 11/2527; G01B 21/20; A61B 5/0062; A61B 5/0088; A61B 5/1077
USPC ...................... 356/601, 607, 608; 348/46, 47; 348/E13.074; 345/419; 382/154
See application file for complete search history.

(56) References Cited

U.S. PATENT DOCUMENTS

| | | | |
|---|---|---|---|
| 2013/0010077 A1* | 1/2013 | Nguyen et al. | 348/46 |
| 2014/0022355 A1* | 1/2014 | Poursohi et al. | 348/47 |

\* cited by examiner

*Primary Examiner* — Tri T Ton
(74) *Attorney, Agent, or Firm* — McDonnell Boehnen Hulbert & Berghoff LLP

(57) ABSTRACT

Methods and systems for multi-modal three-dimensional (3D) scanning of objects are described. An example method may include receiving, from a scanning system, 3D information associated with an object having a first resolution. A region of interest of the object may be determined by a processor based on the 3D information associated with the object. Additionally, instructions for operating the scanning system to determine additional information associated with the region of interest of the object may be determined. The additional information associated with the region of interest may have a second resolution that is higher than the first resolution. The instructions may be provided to the scanning system to determine the additional information associated with the region of interest of the object.

18 Claims, 8 Drawing Sheets

US 8,848,201 B1

MULTI-MODAL THREE-DIMENSIONAL SCANNING OF OBJECTS

CROSS-REFERENCE TO RELATED APPLICATIONS

This application claims the benefit of U.S. Provisional Application No. 61/716,509 filed on Oct. 20, 2012, the entirety of which is herein incorporated by reference.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models may represent a 3D object conceptually using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or based on data from objects that are scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

SUMMARY

In one example aspect, a method is provided that comprises receiving, from a scanning system, three-dimensional (3D) information associated with an object. The 3D information associated with the object may have a first resolution. The method may further include determining, by a processor, a region of interest of the object based on the 3D information associated with the object. The method may also include determining instructions for operating the scanning system to determine additional information associated with the region of interest of the object. The additional information associated with the region of interest of the object may have a second resolution that is higher than the first resolution. Additionally, the instructions for operating the scanning system may include instructions for positioning a scanning component to obtain the additional information from one or more viewpoints. According to the method, the instructions may be provided to the scanning system to determine the additional information associated with the region of interest of the object.

In another example aspect, a non-transitory computer-readable memory having stored thereon instructions executable by a computing device to cause the computing device to perform functions is provided. The functions may comprise receiving, from a scanning system, three-dimensional (3D) information associated with an object. The 3D information associated with the object may have a first resolution. The functions may further include determining a region of interest of the object based on the 3D information associated with the object. The functions may also include determining instructions for operating the scanning system to determine additional information associated with the region of interest of the object. The additional information associated with the region of interest of the object may have a second resolution that is higher than the first resolution. Additionally, the instructions for operating the scanning system may include instructions for positioning a scanning component to obtain the additional information from one or more viewpoints. According to the functions, the instructions for operating the scanning system may be provided to the scanning system to determine the additional information associated with the region of interest of the object.

In still another example aspect, a system is provided that comprises a scanning component, a positioning component, and a computing component. The scanning component may be configured to obtain multi-resolution information associated with objects using two or more modes. The positioning component may be configured to adjust a viewpoint of the object. The computing component may be configured to receive three-dimensional (3D) information associated with the object having a first resolution, and determine a region of interest of the object based on the 3D information associated with the object. The computing component may be further configured to determine instructions for operating the positioning component to determine additional information associated with the region of interest of the object. The additional information may have a second resolution that is higher than the first resolution. Additionally, the instructions may include instructions for obtaining the additional information from one or more viewpoints. The computing component may also be configured to provide the instructions to the positioning component and the scanning component to determine the additional information associated with the region of interest.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8 is a schematic illustrating a conceptual partial view of an example computer program product that includes a computer program for executing a computer process on a

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for multi-modal three-dimensional (3D) scanning of objects. A scanning system may be capable of determining 3D information associated with an object having varying levels of resolution. For instance, a 3D scanner may use a fast, low detail scan to determine a shape of the object. Based on information from the low detail scan, regions of interest that may be the target for higher quality data gathering may be determined. Given the regions of interest, a processor may determine a plan or instructions for how to capture information of a higher level of resolution for the regions of interest.

As an example, a low resolution 3D model of an object may be determined by a scanning system. Areas of the object to focus on for higher resolution data acquisition may then be determined based on inputs of shape, color, and/or reflectance from regions of the low resolution 3D model. Additionally, instructions may be determined for obtaining higher resolution shape and/or surface material information for the areas of the object. For example, the instructions may indicate to capture one or more zoomed-in images of the object to obtain higher resolution two-dimensional (2D) or 3D information. In other examples, the low resolution 3D model of the object may be provided to a search engine to recognize the object. Based on an identity of the object and information associated with the recognized object, regions of interest of the object may be determined.

Thus, in one instance, a scanning system may learn where to obtain more detailed information (e.g., higher resolution information) for an object and how to scan the object to obtain the more detailed information. In some instances, scanning almost the whole object using a first resolution and scanning regions of interest using a higher resolution scanner or higher resolution methods may be quicker and more computationally efficient than scanning almost the whole object using the higher resolution scanner or methods.

Figure 1:
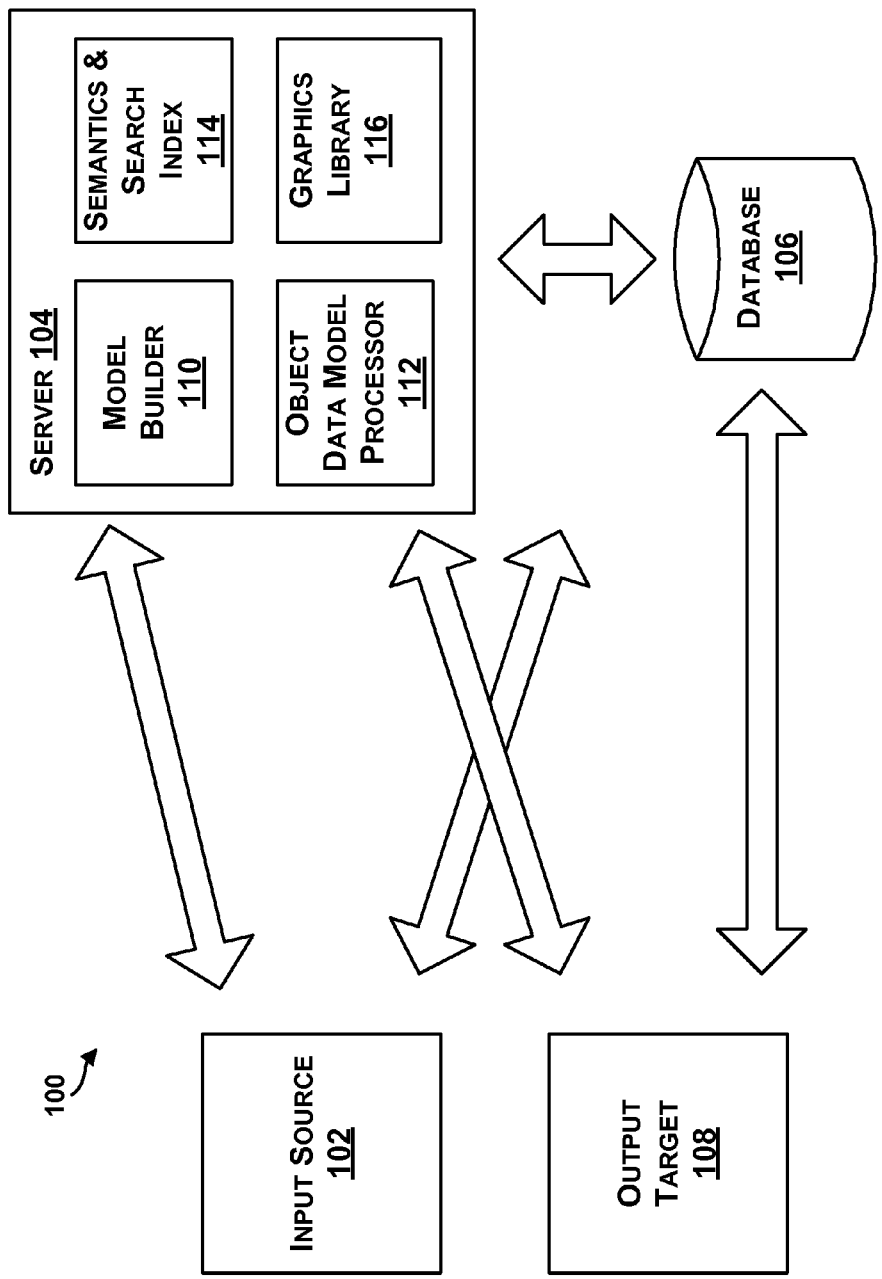
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model, or 3D model, may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no UV unwrapping to generate a mesh (D) with UV unwrapping but no colors. UV unwrapping refers to the unwrapping of a 3D mesh to a 2D space for texturing purposes, where the 2D space is denoted, by convention, with "u" and "v" coordinates since "x", "y", and "z" are used for 3D space. As an example, for a single output texture pixel of an image processing may include, for a given point in UV determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The database 106 may store all data sets for a 3D object data model in any number of various forms from raw data captured to processed data for display. In addition, the database may store one or more statistical models for the 3D object data model.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display. In some instances, a scanning system may be configured to capture varying levels of detail or resolution of an object using one or more modes. For example, the scanning system may acquire low resolution data for an object or a portion of the object and high resolution data for one or more areas of interest of the object.

Figure 2:
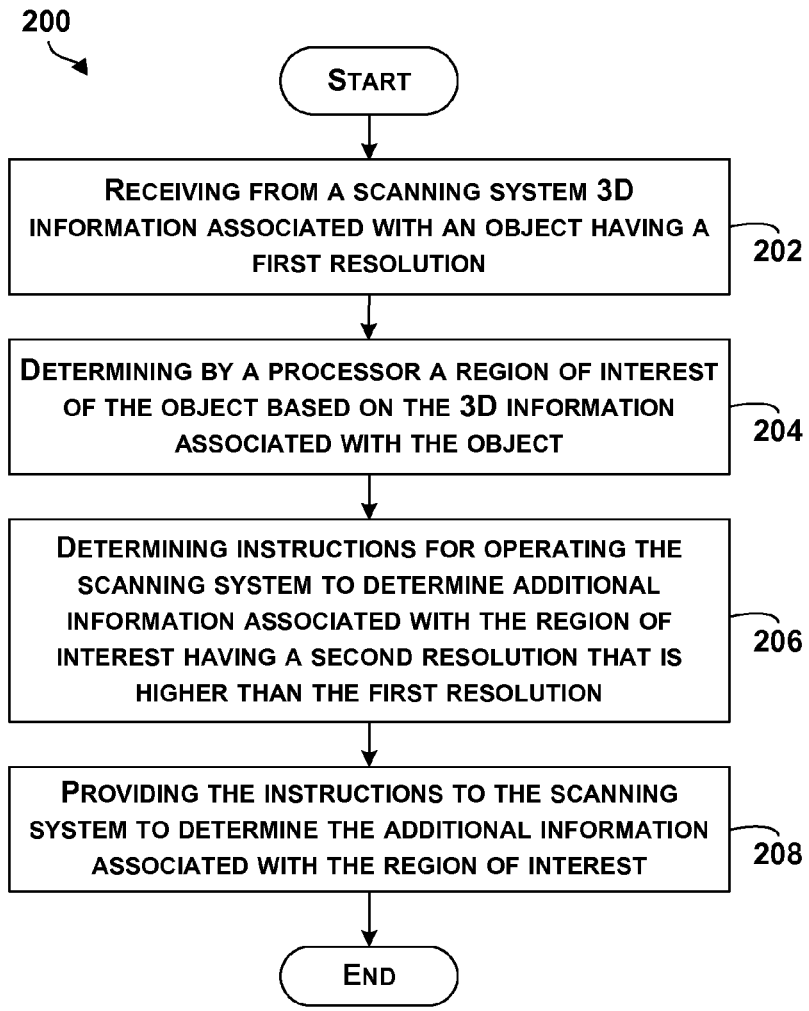
FIG. 2 is a block diagram of an example method for multi-modal three-dimensional (3D) scanning of objects.

FIG. 2 is a block diagram of an example method 200 for multi-modal three-dimensional (3D) scanning of objects. Method 200 shown in FIG. 2 presents an embodiment of a method that could be used by the system 300 of FIGS. 3A-3B, for example. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes receiving from a scanning system 3D information associated with an object having a first resolution. In one example, the scanning system may include a 3D scanner configured to determine distances to points on surfaces of the object. The distances to points on the surfaces of the object may be in the form of a 3D point cloud. However, other forms are also possible. The 3D information associated with the object may then be communicated to a computing component via a wired or wireless communication link. Various types of objects may be scanned, such as shoes, clothing, furniture, accessories, computers, phones, toys, or any type of object.

For instance, the 3D scanner may be an active scanner that emits some kinds of radiation and detects a reflection of the emitted radiation to probe an object. As an example, the 3D scanner may emit any type of light or an ultrasonic pulse. Various types of active scanners include time-of-flight 3D laser scanners and triangulation 3D laser scanners. In addition, the 3D scanner may be a structured-light 3D scanner or modulated light 3D scanner. In other examples, the 3D scanner may be a non-contact passive 3D scanner that detects reflected ambient radiation. For example, the 3D scanner may be a stereoscopic system employing two videos cameras or a photometric system configured to capture multiple images under varying lighting conditions. In another example, the 3D scanner may capture a silhouette. For instance, a sequence of photographs of an object may be captured against a contrasting background, and the sequence of photographs may be extruded and intersected to form a visual hull approximation of the object. Thus, 3D information associated with the object may be determined by a 3D scanner, and the 3D information associated with the object may be received by a computing component of the scanning system.

In some examples, the 3D information associated with the object may also include color or appearance information for surfaces of the object. For example, the scanning system or 3D scanner may include a camera or other type of imaging device configured to capture images or videos of the object. In some instances, the 3D scanner and the camera may be directly coupled. For example, the 3D scanner and the camera may be part of a scanning component. In other instances, the 3D scanner and camera may be separate. Optionally, the 3D scanner and camera may communicate via a wired or wireless connection.

In one instance, the 3D information associated with the object may be of a first resolution that is low detail. For instance, the 3D information may be obtained using a coarse, quick scan of the object. In one example, the 3D information may include depth and color information captured at a frame rate of about 30 frames per second resulting in a colored point cloud that contains about 300,000 points per frame. In some examples, the first resolution 3D information may be captured for 360 degrees around the object. Subsequently, a rough shape of the object may be determined by merging and aligning the sample points from viewpoints around the object. Various algorithms may be used to align the scans to form a 3D object. The iterative closest point algorithm is one example of an algorithm to reconstruct 3D surfaces from different scans.

At block 204, the method 200 includes determining by a processor a region of interest of the object based on the 3D information associated with the object. In some examples, inputs of shape or color from the 3D information associated with the object may be used to determine the region of interest.

For example, an amount of change in geometry of a portion of the object may be an indication of a potential region of interest. In one example, the 3D information associated with the object may indicate a portion of the object where an average depth between neighboring points of a point cloud is greater than a predetermined depth threshold. Subsequently, the portion of the object and optionally an area surrounding the portion may be selected as a region of interest. In one example, smooth areas of the object with little change in geometry may be filtered out, and areas of an object with intricate changes in geometry may be selected. Other methods of classifying changes in geometry, such as determining differences between surface normals or curvature at neighboring points or points within a sphere centered at a point, are also possible.

In another example, a region of interest for an object may be determined based on a color of reflectance of a portion of the object. For example, the 3D information associated with the object may be analyzed to determine portions of the object that are reflective or shiny, and the reflective areas may be selected by a processor as regions of interest. Determining areas that are reflective or shiny may involve determining an amount of specular reflection or other surface reflectance properties for portions of the object, identifying specular surfaces in an image, or identifying specular highlights on a surface of the object. In other examples, a shiny surface may be detected based on an intensity of a laser signal (or other type of emitted radiation) that is reflected back to a photodiode.

In still other examples, the processor may determine the region of interest based on color information for a surface of the object. For example, surfaces of an object may be segmented based on colors or groups of colors in an image using image processing. If a segment of an image and a corresponding region of interest of the object is different than other segments by more than a predetermined amount (e.g., as determined by a distance measure between average color values), the segment and corresponding region of interest may be selected as a region of interest. In still other examples, a region of interest may be determined based on saturation or luminance values of an image. For instance, regions of an image and corresponding regions of interest of the object may be selected as regions of interest if a region of an image is below or above a saturation level (e.g., if the region of the image is too dark or too light in an image).

In yet another example, a region of interest may be determined based on information stored with the object. For example, an operator may indicate the type of object, or a code such as a barcode, Quick Response (QR) code, etc., may be scanned to determine the type of object or information stored with the object. In some examples, information stored with an object may be accessed from a database (e.g., using a lookup table or function), and may include a 3D model of the object for which regions of interest are indicated. The 3D model of the object may be aligned with the 3D information associated with the object that is received from the scanning system (e.g., using normalization techniques such as principal component analysis alignment to solve for an optimal rotation that aligns two similar 3D models). Subsequently, locations of the region(s) of interest may be mapped from the 3D model to the object, and selected as the regions of interest for the object.

Given regions of interest for an object, a plan for viewing the region(s) of interest and obtaining additional information for the region(s) of interest may be determined. At block 206, the method 200 includes determining instructions for operating the scanning system to determine additional information associated with the region of interest having a second resolution that is higher than the first resolution. In some examples, the instructions may include instructions for positioning a scanning component to determine the additional information from one or more viewpoints.

For instance, the object may be positioned on a turntable, and the instructions may include commands to rotate the turntable by a first amount of rotation such that a first region of interest is visible to the scanning component from a first viewpoint, and rotate the turntable by a second amount of rotation such that a second region of interest is visible to the scanning component from a second viewpoint of the object at a subsequent instance in time. In another example, an orientation of the object may be adjusted by a positioning component. For example, a robotic arm may rotate the object 45 degrees to adjust the orientation of the object with respect to the scanning component. Thus, the orientation of the object may be changed relative to a position of the scanning component to obtain additional information from a viewpoint.

In other examples, a position of the scanning component may be adjusted by a same or different positioning component. For example, the scanning component may be a camera or 3D scanner attached to a robotic arm, and the instructions may include commands for moving, panning, tilting, or rotating the scanning component to another position and/or orientation. In some instances, multiple scanning components may be attached to a robotic arm(s), and the instructions may include commands for adjusting a position and/or orientation of the multiple scanning components.

The instructions may also provide instructions for the scanning system to obtain additional information that is of a second level of detail or resolution that is higher than the first resolution. The additional information may include 3D geometry information or material information for surfaces of the object, and the term resolution may broadly refer to any metric describing level of detail. For example, resolution may refer to the smallest discernible feature on a surface of the object. Alternatively, resolution may refer to a minimum separate between two points on the surface of the object when the two points are distinguishable in a 2D or 3D image. In the case of 3D information, resolution may also refer to an accuracy, or image quality in the depth or range dimension, of a 3D scanner. As an example, information may be of a higher resolution due to a decrease in a standard deviation or error in distances to points on the surface of the object. In one instance, a scanning component may have a resolution and accuracy enabling detection of changes in feature separation and surface height down to millimeter or micrometer levels (e.g., 0.5 mm, 40 um, etc.). Resolution may also refer to depth of field or field of view of a 3D scanner.

In some instances, hardware or software may be used to increase the resolution of the additional information obtained for the region(s) of interest of the object. For example, a first scanning component may have been used to determine the received 3D information associated with the object, and a second scanning component may be used to obtain the additional information associated with the region(s) of interest. In one instance, the second scanning component may be a 3D scanner with a higher resolution, higher accuracy, broader or narrower depth of field, or broader or narrower field of view. In another example, a scanning component may be configurable to determine information associated with the object using varying levels of resolution, and the instructions may provide commands for increasing the level of resolution of the scanning component prior to obtaining the additional information associated with the region(s) of interest.

In still another example, the instructions may provide for selecting an appropriate scanning head or filter for a scanning component based on the region of interest. As an example, if the region of interest is substantially small, compared with the size of the object, a telephoto lens may be applied to a camera. Similarly, based on the instructions, scanning components may be swapped out or replaced for different regions of interest based on a desired level of detail for a given region of interest.

At block 208, the method 200 includes providing the instructions to the scanning system to determine the additional information associated with the region of interest. For instance, based on the determined region(s) of interest and corresponding viewpoints for obtaining the additional information, instructions for acquiring the additional information may be sent to the scanning system. In response to the instructions, the scanning system may be caused to obtain additional information of a higher resolution for the region(s) of interest.

In one instance, the instructions may include instructions for obtaining information for multiple regions of interest of the object in a predetermined sequence. Each region of interest may include a viewpoint of the object for obtaining additional information as well as optional parameters for configuring a resolution of the scanning component. Each viewpoint may also require a change in orientation of the object and/or the scanning component. The scanning system may adjust to a viewpoint, acquire information having the second resolution, and repeatedly adjust to another viewpoint to acquire more information having the second resolution until information has been acquired for the regions of interest.

In some examples, the instructions may be provided on a display for an operator. Optionally, an operator of the scanning system may follow the instructions to adjust an orientation of the object, adjust an orientation of a scanning component, adjust a parameter of a scanning component, or replace a scanning component with another scanning component.

Figure 3A:
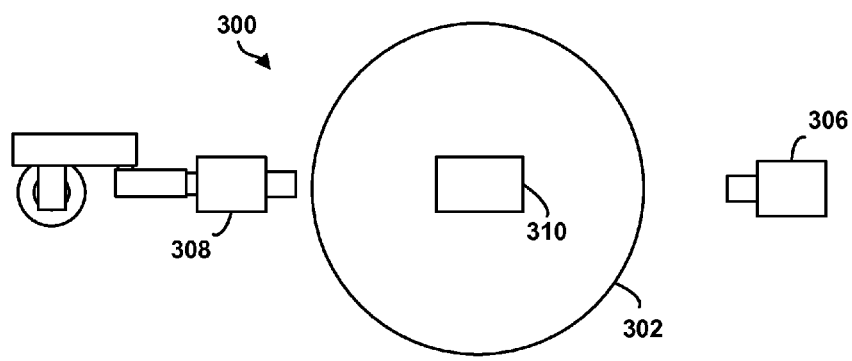
FIG. 3A illustrates a top view of an example system for multi-modal three-dimensional (3D) scanning of objects.
Figure 3B:
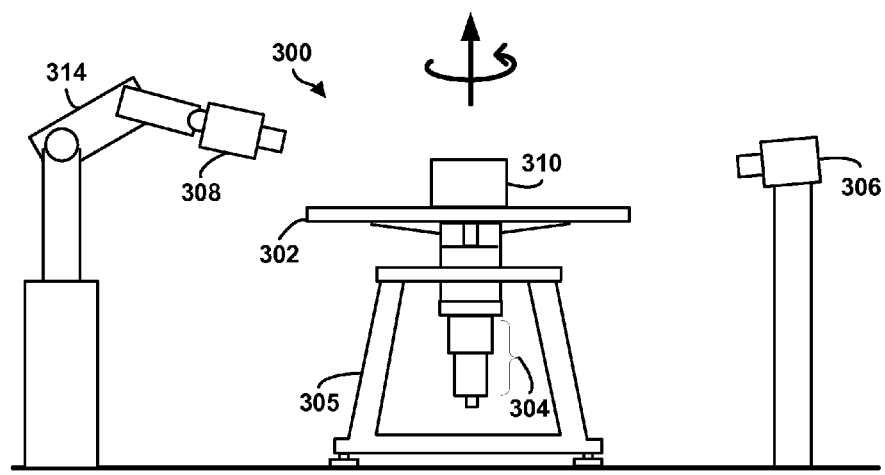
FIG. 3B illustrates a side view of the example system for multi-modal three-dimensional (3D) scanning of objects.

FIG. 3A and FIG. 3B illustrates a top view and side view of an example system 300 for multi-modal three-dimensional (3D) scanning of objects. In some examples, the system 300 may include a rotatable surface 302. Although the rotatable surface 302 is illustrated as a circular surface, other shapes are also possible. In one instance, a computing device of the system may be configured to cause the rotatable surface 302 to incrementally or continuously rotate using a drive system 304. The drive system 304, for example, may include one or more motors and motor drive systems configured to receive commands from a computing device and control rotation of the one or more motors. Other drive systems are also possible, and in some instances, the rotatable surface 302 may be configured to be rotated manually (e.g., by an operator of the system 300). The rotatable surface 302 and the drive system 304 may be supported by a support 305.

The system 300 may also include one or more scanning components, such as a first scanning component 306 and a second scanning component 308, configured to determine information associated with an object 310. The one or more scanning components may be 3D scanning devices, cameras, or other types of devices capable of determining 2D or 3D information associated with the object 310 (or surfaces of the object 310). The one or more scanning components may also be stationary or mobile. The object 310 may be any type of object (e.g., a shoe, purse, computer, statue, or a toy) and may be of any size.

In one example, the first scanning component 306 may be configured to capture information associated with the object 310 having a first resolution and the second scanning component 308 may be configured to capture additional information associated with the object 310 having a second resolution that is higher than the first resolution. For instance, the object 310 may rotate as the rotatable surface 302 rotates, and the first scanning component 306 may capture 3D information associated with the object 310. Subsequently, the second scanning component 308 may be positioned by a positioning component 314 to obtain additional information associated with the object 310 from one or more viewpoints. For example, the positioning component 314 may be a positioning component 314 with six degrees of freedom that is capable of rotating, panning, moving, or titling the scanning component 308 to any position with respect to the object 310.

Although the positioning component 314 is shown as a robotic arm, other types of positioning devices or structures may also be used. For instance, one or more of the scanning components may be attached to a single or multiple axis motion controller with any number of actuators and rotary or linear servo motors.

Different configurations including different components or more or less components than the system 300 are also possible. In another example, the first scanning component 306 may be omitted. For instance, the second scanning component 308 may obtain 3D information associated with the object 310 having a first resolution at a first instance in time and additional information having a second resolution that is higher than the first resolution at a second instance in time. In still another example, the system 300 may include another positioning component (not shown) capable of changing the orientation of the object 310. For instance, the another positioning component may be a robotic arm that is configured to lift, rotate, and lower the object 310 to adjust an orientation of the object 310.

In another example, the system 300 may include one or more lighting components configured to illuminate the object 310 using one or more intensity levels. The one or more lighting components may also be stationary or mobile, and may enable high dynamic range (HDR) imaging of the object 310. For example, a sequence of images of the object or a portion of the object may be captured while the object 310 is illuminated using a varying amount of intensities. A plurality of images having varying exposure levels may then be processed together to determine an image having a greater dynamic range (i.e., a range between a lightest area and darkest area of the image) as compared to image(s) captured using a single exposure level.

Figure 4:
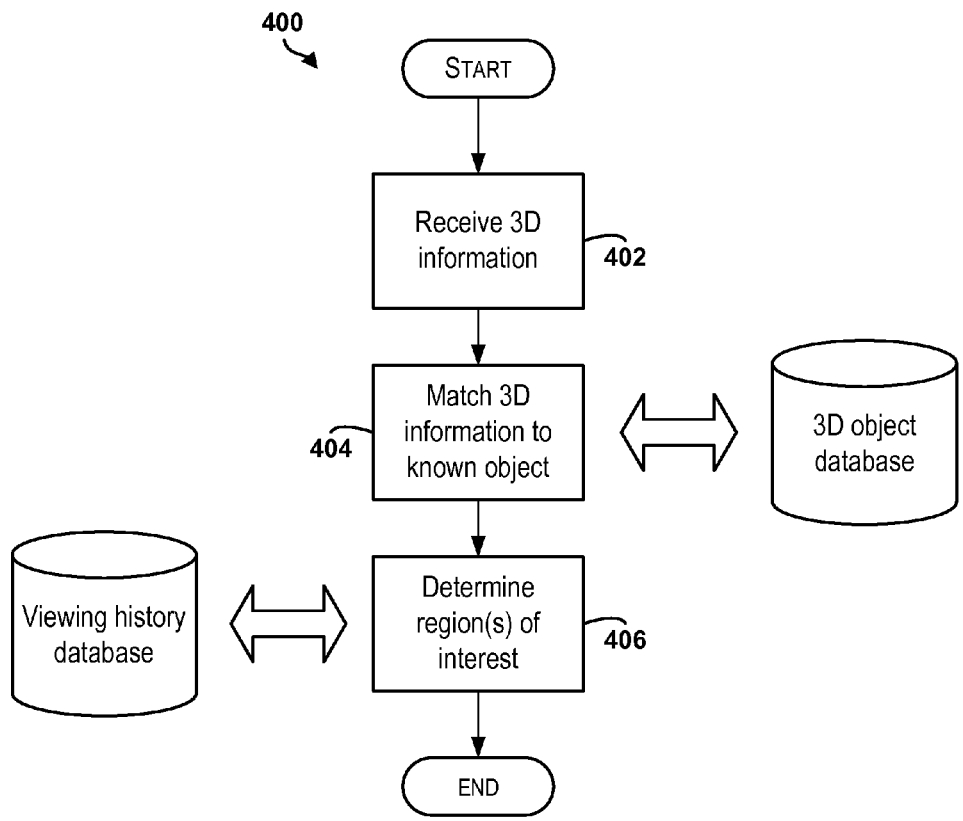
FIG. 4 is an example flow chart for determining a region of interest of an object.

FIG. 4 is an example flow chart 400 for determining a region of interest of an object. In one instance, three-dimensional (3D) information associated with an object may be used to recognize an identity of the object. As shown in FIG. 4, at block 402, 3D information associated with the object may be received. In one example, the 3D information may be received by a computing device that is capable of determining instructions for operating a scanning system to determine additional information associated with the object. In another example, the 3D information may be received by an application in a server that is remote from a scanning system.

Subsequently, at block 404, the received 3D information may be matched to 3D information for a plurality of objects to determine an identity of the object. For example, a shape search engine may be configured to determine a 3D object from a 3D object database whose shape matches the received 3D information. As an example, the 3D information may be a point cloud, and the shape search engine may determine interest points within the point cloud. Descriptors that describe an area around an interest point in a way that is comparable to known descriptors for objects of the 3D object database may also be calculated. Subsequently, the descriptors for the point cloud may be compared to descriptors or templates of descriptors for objects from the 3D object database. Other shape matching algorithms and techniques are also possible. In some instances, an object from the 3D object database that matches the descriptors may be determined to be a match to the 3D information.

Information stored with the object in the 3D object database, such as metadata, may indicate an identity of the object or a class or type of object to which the object matches. Based on a determined identity of the object, at block 406, region(s) of interest for the object may be determined. In one instance, the regions of interest may be determined based on information stored in a viewing history database. For example, the viewing history database may log and store information regarding portions of objects that are viewed or inspected while a 3D model of the object is rendered on a display. Frequencies with which portions of a 3D model of the object are inspected by clicking on or zooming in on a portion of the 3D model may also be determined and stored in the database. In some instances, eye tracking methods may be used to determine portions of an object that are of interest to a user based on a gaze direction of the user while inspecting the 3D model of the object. Thus, the viewing history database may include information identifying one or more regions of interest for a plurality of objects.

Figure 5A:
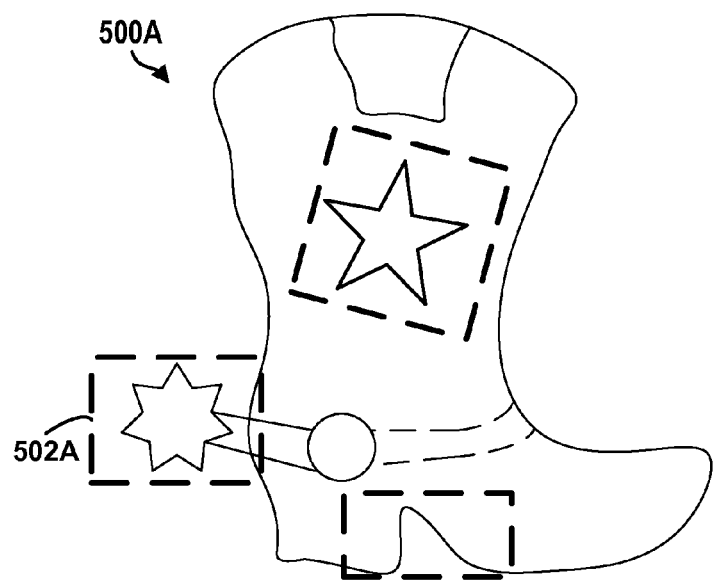
FIGS. 5A-5B are example conceptual illustrations of regions of interest of an object.
Figure 5B:
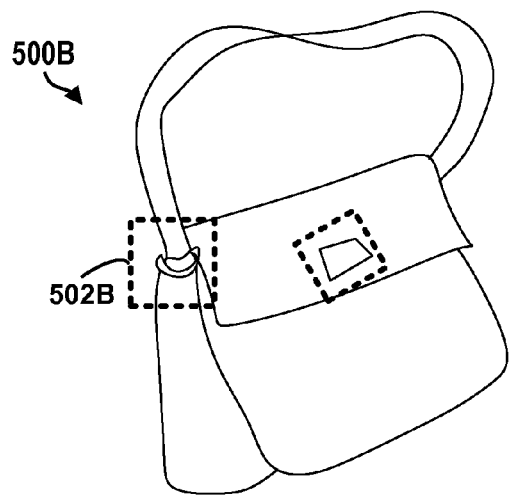

FIGS. 5A-5B are conceptual illustrations of regions of interest of an object. As shown in FIG. 5A, three-dimensional (3D) information for an object, such as a boot 500A may be received. The 3D information may be a rough shape of the object and features of the object. In one example, regions of interest 502A may be selected based on changes in geometry or material information for the object, or based on known regions of interest for boots. For instance, a region of interest 502A may be a spur of the boot 500A or a shiny star on the boot 500A. In another example, a heel or bottom portion of the boot 500A may be selected as a region of interest 502A. If the region of interest 502A is near a bottom of the boot 500A, a positioning component or operator may adjust the orientation of the object such that bottom of the boot 500A is exposed for a subsequent viewing of the object by a scanning component.

As shown in FIG. 5B, in another instance, the object may be a purse 500B. Received 3D information associated with the purse 500B may be used to determine where on the purse 500B intricate things (such as shiny things) are located, or where the geometry of the purse is interesting and non-uniform. For instance, two regions of interest 502B may be determined for a clasp of the purse 500B and a side of the purse 502B where a strap adheres to the purse 502B.

In other instances, fewer or more regions of interest may be determined for an object. Additionally, regions of interest may be larger or smaller based on the received 3D information for portions of a scanned object. Based on the determined region(s) of interest, instructions may be determined for operating a scanning system to determine additional information for an object.

Figure 6:
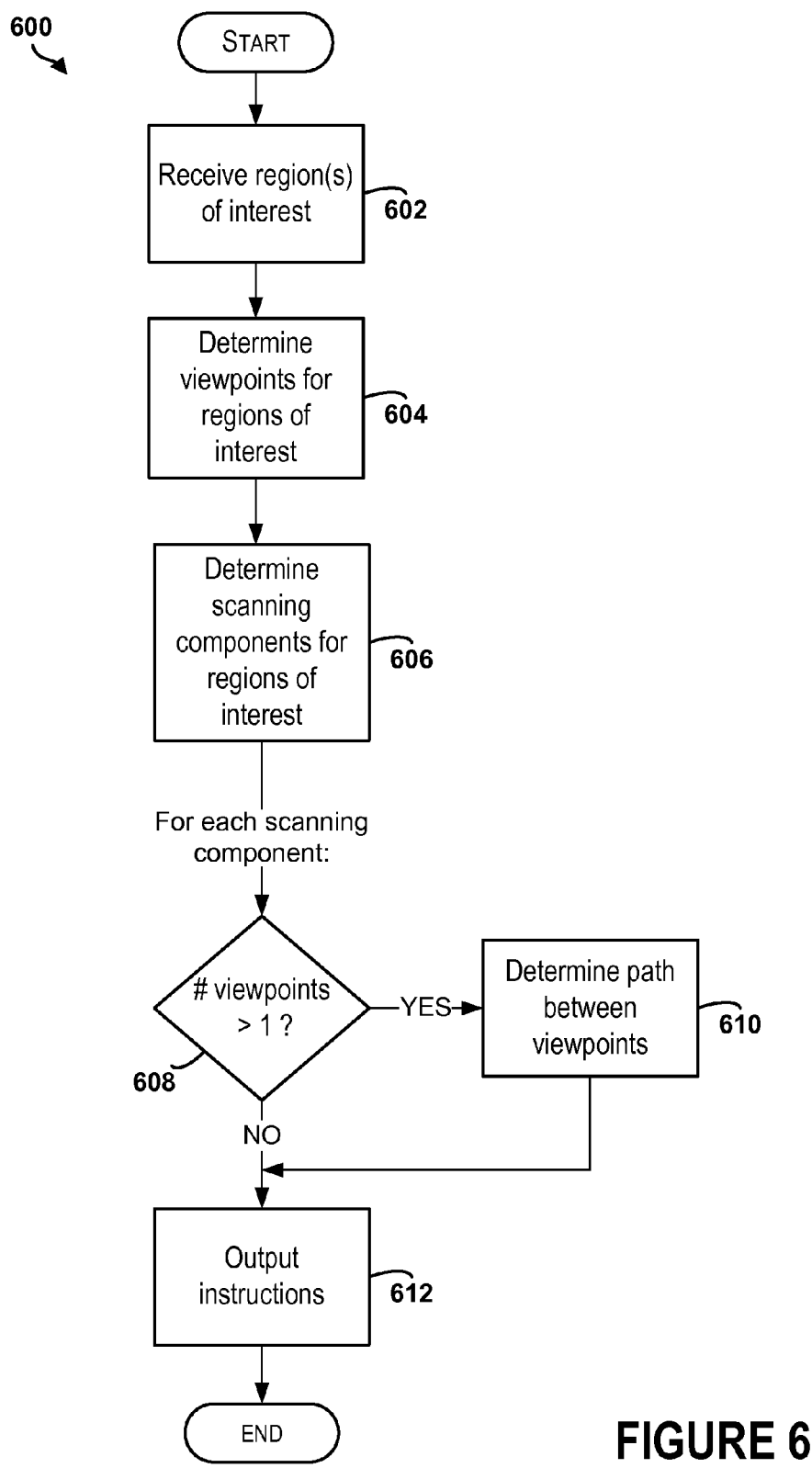
FIG. 6 is an example flow chart for determining instructions for operating a scanning system.

FIG. 6 is an example flow chart 600 for determining instructions for operating a scanning system. As shown in FIG. 6, at block 602, one or more regions of interest of an object may be received. In some examples, the regions of interest may be a portion of a three-dimensional (3D) point cloud representing an object for which higher resolution information is desired. In one example, the higher resolution information may include more detailed 3D information. In another example, the more detailed information may be a high resolution image of a portion of a surface of the object.

Based on the regions of interest for the object, at block 604, viewpoints for obtaining additional information associated with the regions of interest may be determined. In one instance, one viewpoint may be determined for each region of interest. In other examples, multiple viewpoints may be determined for a given region of interest. Determining a viewpoint for a region of interest may involve determining a position for a scanning component and/or an orientation of the object. For example, if the object is being scanned on a rotatable surface, the surface may be caused to be rotated such that the region of interest is exposed to a scanning component. In another instance, an orientation of a scanning component, such as a 3D scanner coupled to a robotic arm, may be aligned with an average surface normal vector of a group of points of the region of interest. Optionally, a viewpoint may be determined based on a distance from the object that enables the region of interest to be captured within a field of view of a scanning component. For example, a scanning component may zoom in or move closer to an object if the region of interest is significantly smaller (e.g., consuming less than half of a field of view) of the scanning component. In one instance, a viewpoint may be a 3D position that is determined relative to a position of the object or with respect to an absolute coordinate system of the scanning system.

Additionally, at block 606, a scanning component may be determined for the regions of interest. For example, 2D and/or 3D scanning components may be selected for particular regions of interest. In one example, if color information for a region of interest is too light or too dark, a high dynamic range scanning component may be selected. In another example, if a region of interest includes a large amount of variation in geometry (e.g., as determined by comparing an average point curvature to a curvature threshold), a high resolution 3D scanning component may be selected. For instance, the high resolution 3D scanning component may use varied colored structured light projection patterns. In still another example, both a camera and a 3D scanner may be selected for the region(s) of interest.

Based on a decision at block 608, if the number of viewpoints is greater than one for a given scanning component, at block 610 a path between the viewpoints may be determined. For example, a first scanning component may be associated with three viewpoints at three points in a three-dimensional space, and an order for positioning the scanning component at each of the three viewpoints may be determined. In some examples, the order may be a random order. In other examples, the order may be determined based on an angle from the object to a 3D point, such that the scanning component moves clockwise around the object (e.g., when looking at a top down view of the object) from a first viewpoint to a second viewpoint, and moves clockwise again around the object from the second viewpoint to the third viewpoint.

Based on the determined path between viewpoints for each scanning component, instructions may be output at block 612. For example, the instructions may include a series of viewpoint positions and scanning components or parameters for scanning components to be iterated through in order to determine the additional information associated with the regions of interest. The instructions may be output according to a language or style that is readable by the scanning component(s) and/or positioning component(s) of the scanning system. In some instances, the instructions may also be output to a display to indicate feedback for an operator who is observing or maintaining the scanning system.

Figure 7:
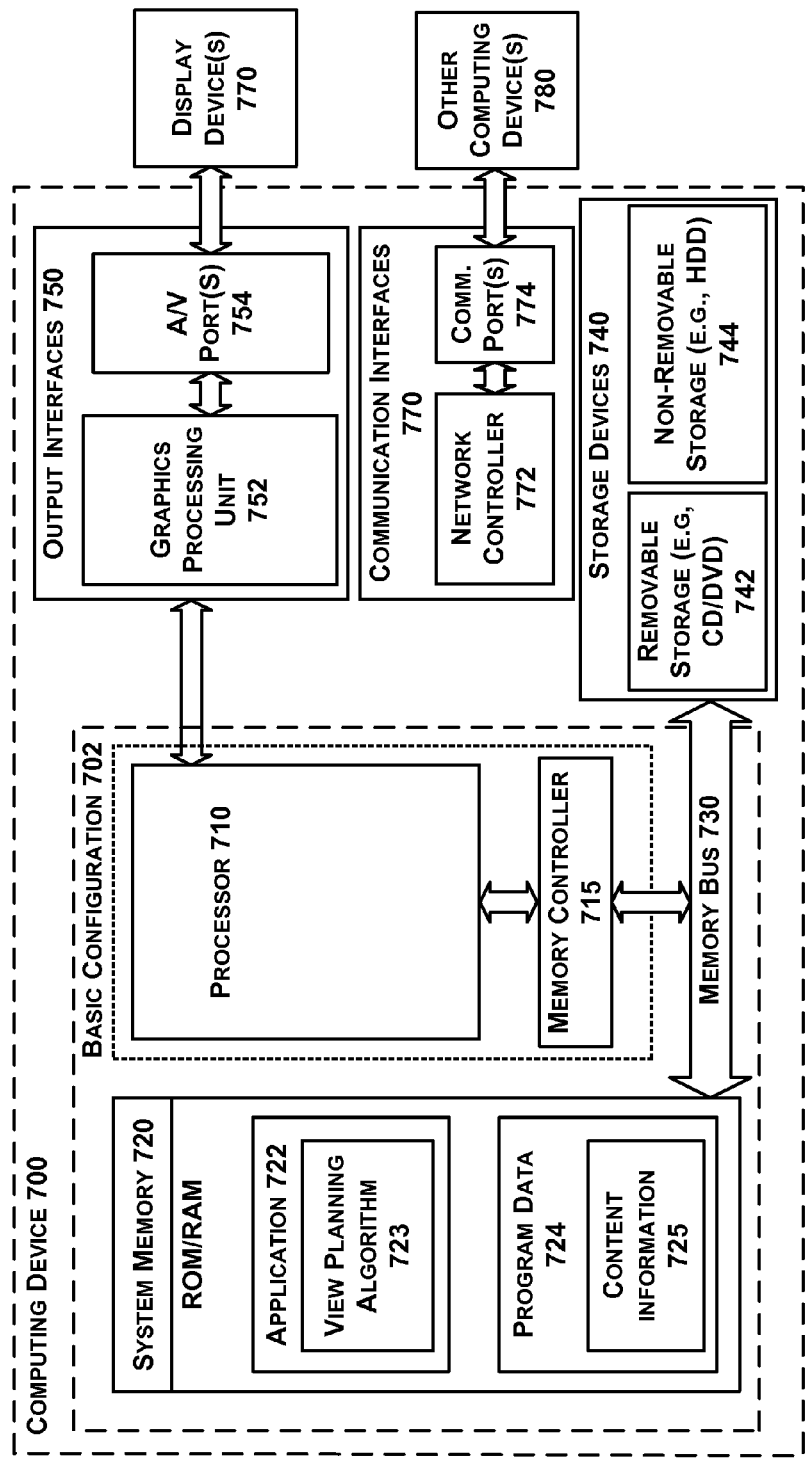
FIG. 7 is a functional block diagram illustrating an example computing device used in a computing system that is arranged in accordance with at least some embodiments described herein.

FIG. 7 is a functional block diagram illustrating an example computing device 700 used in a computing system that is arranged in accordance with at least some embodiments described herein. The computing device 700 may be a personal computer, mobile device, cellular phone, touch-sensitive wristwatch, tablet computer, video game system, or global positioning system, and may be implemented to provide a system for multi-modal three-dimensional (3D) scanning of objects as described in FIGS. 1-6. In a basic configuration 702, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 may include one or more applications 722, and program data 724. Application 722 may include a view planning algorithm 723 that is arranged to provide inputs to the electronic circuits, in accordance with the present disclosure. Program data 724 may include content information 725 that could be directed to any number of types of data. In some example embodiments, application 722 can be arranged to operate with program data 724 on an operating system.

Computing device 700 can have additional features or functionality, and additional interfaces to facilitate communications between the basic configuration 702 and any devices and interfaces. For example, data storage devices 740 can be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of computing device 700.

Computing device 700 may also include output interfaces 750 that may include a graphics processing unit 752, which can be configured to communicate to various external devices such as display devices 770 or speakers via one or more A/V ports or a communication interface 770. The communication interface 770 may include a network controller 772, which can be arranged to facilitate communications with one or more other computing devices 780 over a network communication via one or more communication ports 774. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including laptop computers, tablet computers, netbooks computers, and other computer configurations.

Figure 8:
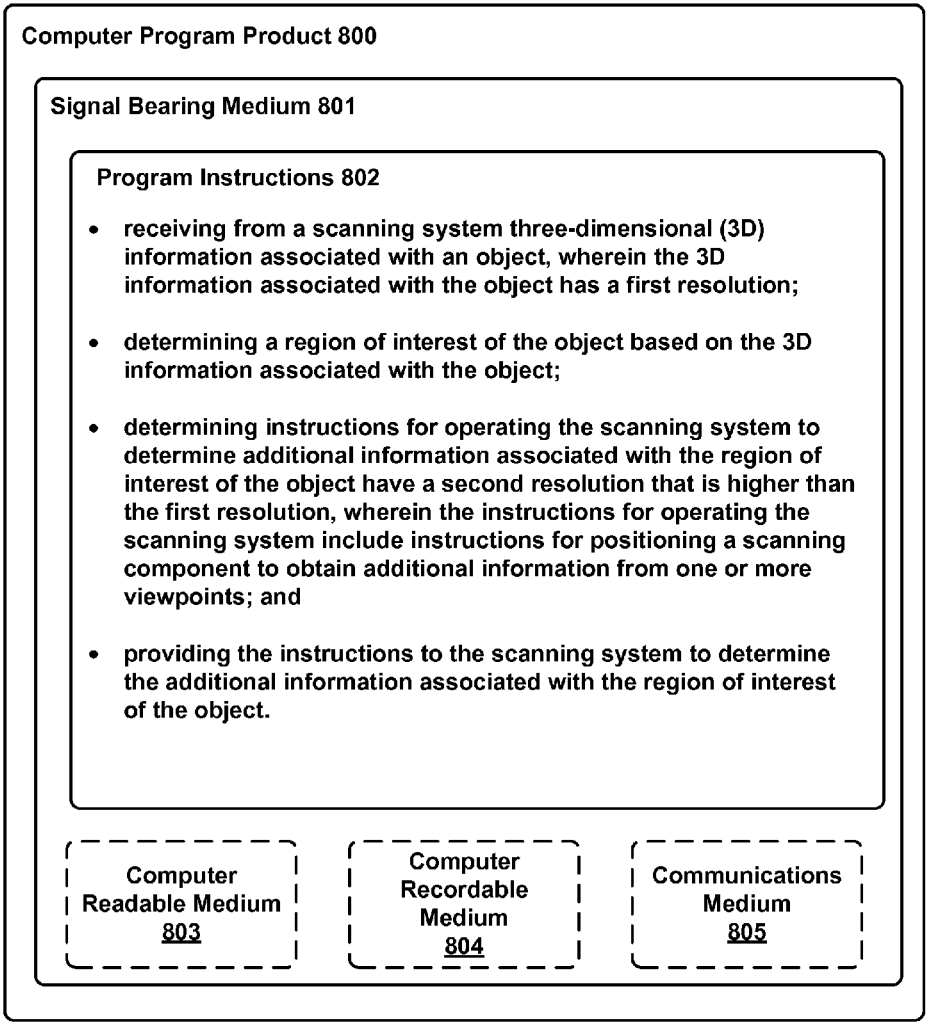

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-7. In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving from a scanning system three-dimensional (3D) information associated with an object, wherein the 3D information associated with the object has a first resolution and comprises surface geometry information for the object;
    determining, by one or more processors, a region of interest of the object based at least in part on the surface geometry information for the object, wherein the region of interest comprises a portion of the object having an amount of variation in surface geometry that satisfies a threshold, wherein the surface geometry information for the object comprises a 3D point cloud, and wherein the amount of variation in surface geometry comprises an amount of variation in points of the 3D point cloud;
    determining instructions for operating the scanning system to determine additional information associated with the region of interest of the object having a second resolution that is higher than the first resolution, wherein the instructions for operating the scanning system include instructions for positioning a scanning component to obtain the additional information from one or more viewpoints; and
    providing the instructions to the scanning system to determine the additional information associated with the region of interest of the object.

2. The method of claim 1, wherein the region of interest is further determined based on a color or reflectance of the portion of the object.

3. The method of claim 1, wherein the instructions for operating the scanning system further include information associated with a change in orientation of the object, and the method further comprises providing an instruction for causing the scanning system to rotate the object.

4. The method of claim 1, wherein determining the region of interest of the object further comprises:
    determining an identity of the object based on the 3D information associated with the object and a database of 3D object models; and
    determining the region of interest of the object based on information associated with a 3D object model of the object.

5. The method of claim 4, wherein the information associated with the 3D object model includes information associated with portions of interest of the 3D object model which are inspected while the 3D model is rendered on a display.

6. The method of claim 1, wherein the additional information associated with the region of interest of the object includes 3D geometry information or material information for the object having the second resolution.

7. The method of claim 1, wherein instructions for operating the scanning system further include instructions for selecting the scanning component from among multiple scanning components based on the 3D information associated with the region of interest.

8. The method of claim 1, wherein the instructions for operating the scanning system further include instructions for:
    adjusting an illumination of the object; and
    obtaining a plurality images of the region of interest having varying exposure levels.

9. A non-transitory computer-readable medium having stored therein instructions executable by one or more computing devices to cause the one or more computing devices to perform functions comprising:
    receiving from a scanning system three-dimensional (3D) information associated with an object, wherein the 3D information associated with the object has a first resolution and comprises surface geometry information for the object;
    determining a region of interest of the object based at least in part on the surface geometry information for the object, wherein the region of interest comprises a portion of the object having an amount of variation in surface geometry that satisfies a threshold, wherein the surface geometry information for the object comprises a 3D point cloud, and wherein the amount of variation in surface geometry comprises an amount of variation in points of the 3D point cloud;
    determining instructions for operating the scanning system to determine additional information associated with the region of interest of the object having a second resolution that is higher than the first resolution, wherein the instructions for operating the scanning system include instructions for positioning a scanning component to obtain the additional information from one or more viewpoints; and
    providing the instructions for operating the scanning system to the scanning system to determine the additional information associated with the region of interest of the object.

10. The non-transitory computer readable medium of claim 9, wherein the region of interest is further determined based on a color or reflectance of the portion of the object.

11. The non-transitory computer readable medium of claim 9, wherein determining the region of interest of the object further comprises:
    determining an identity of the object based on the 3D information associated with the object and a database of 3D object models; and
    determining the region of interest of the object based on information associated with a 3D object model of the object.

12. The non-transitory computer readable medium of claim 9, wherein the instructions for operating the scanning system further include instructions for:
    adjusting an illumination of the object; and
    obtaining a plurality images of the region of interest having varying exposure levels.

13. A system comprising:
    a scanning component, the scanning component configured to obtain multi-resolution information associated with an object using two or more modes;
    a positioning component configured to adjust a viewpoint of the object; and
    one or more computing components, the one or more computing components configured to:

receive three-dimensional (3D) information associated with the object having a first resolution, wherein the 3D information associated with the object comprises surface geometry information for the object;

determine a region of interest of the object based at least in part on the surface geometry information for the object, wherein the region of interest comprises a portion of the object having an amount of variation in surface geometry that satisfies a threshold, wherein the surface geometry information for the object comprises a 3D point cloud, and wherein the amount of variation in surface geometry comprises an amount of variation in points of the 3D point cloud;

determine instructions for operating the positioning component to determine additional information associated with the region of interest of the object having a second resolution that is higher than the first resolution, wherein the instructions include instructions for obtaining the additional information from one or more viewpoints; and provide the instructions to the positioning component and the scanning component to determine the additional information associated with the region of interest.

14. The system of claim 13, wherein the region of interest is further determined based on a color or reflectance of the portion of the object.

15. The system of claim 13, wherein determining the region of interest of the object further comprises:

determining an identity of the object based on the 3D information associated with the object and a database of 3D object models; and determining the region of interest of the object based on information associated with a 3D object model of the object.

16. The system of claim 13, wherein the positioning component is configured to adjust an orientation of the object to adjust a viewpoint of the object.

17. The system of claim 13, wherein the positioning component is configured to adjust a position of the scanning component to adjust a viewpoint of the object.

18. The method of claim 1, wherein the amount of variation in surface geometry comprises an average depth between neighboring points of the point cloud.

\* \* \* \* \*